US012066112B2

(12) United States Patent
Kang et al.

(10) Patent No.: US 12,066,112 B2
(45) Date of Patent: Aug. 20, 2024

(54) VALVE ACTUATOR

(71) Applicant: LG ELECTRONICS INC., Seoul (KR)

(72) Inventors: Joohang Kang, Seoul (KR); Youngchan Ahn, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/870,337

(22) Filed: Jul. 21, 2022

(65) Prior Publication Data

US 2023/0067855 A1 Mar. 2, 2023

(30) Foreign Application Priority Data

Aug. 30, 2021 (KR) ........................ 10-2021-0114406

(51) Int. Cl.
*F16K 1/14* (2006.01)
*F16K 31/04* (2006.01)
*F16K 31/53* (2006.01)

(52) U.S. Cl.
CPC .............. *F16K 1/14* (2013.01); *F16K 31/047* (2013.01); *F16K 31/535* (2013.01)

(58) Field of Classification Search
CPC ......... F16K 31/045; F16K 31/535; F16K 1/14
See application file for complete search history.

(56) References Cited

U.S. PATENT DOCUMENTS 2,761,331 A * 9/1956 Buescher .............. F16K 31/046 192/139
4,261,224 A * 4/1981 Sulzer ................... F16K 31/042 475/263
6,073,907 A * 6/2000 Schreiner, Jr. ........ F16K 31/043 251/291
6,478,131 B2 * 11/2002 Baccanini ............... F16D 23/12 68/12.24
7,055,795 B2 * 6/2006 Lay ....................... F16K 31/055 251/249.5

(Continued)

FOREIGN PATENT DOCUMENTS

KR 20090073402 7/2009
KR 20-0458179 1/2012

OTHER PUBLICATIONS

Extended European Search Report in European Appln. No. 22189401.7, mailed on Jan. 24, 2023, 8 pages.

(Continued)

*Primary Examiner* — Reinaldo Sanchez-Medina
*Assistant Examiner* — Nicole Gardner
(74) *Attorney, Agent, or Firm* — Fish & Richardson P.C.

(57) ABSTRACT

A valve actuator includes a motor and a gear assembly including an input gear rotated by driving force of the motor, an output gear receiving rotational force of the input gear, and at least one power transmission gear transmitting the rotational force of the input gear to the output gear. The valve actuator further includes a valve output shaft coupled to the output gear and actuated to close a path of a valve, and a selective power transmitter interrupting rotation of the output gear after the output gear is rotated at a predetermined angle by the rotational force of the input gear. After the valve is actuated to close the path, the driving force of the motor is not transmitted to the valve output shaft.

7 Claims, 11 Drawing Sheets

(56) References Cited

U.S. PATENT DOCUMENTS

| | | | | |
|---|---|---|---|---|
| 7,607,637 B2 * | 10/2009 | Furrer | F24F 13/1426 251/248 |
| 10,527,136 B2 | 1/2020 | Roch et al. | |

OTHER PUBLICATIONS

Office Action in Korean Appln. No. 10-2021-0114406, mailed on Aug. 4, 2023, 8 pages (with English translation).

* cited by examiner

VALVE ACTUATOR

CROSS-REFERENCE TO RELATED APPLICATION

This application claims priority to and the benefit of Korean Patent Application No. 10-2021-0114406 filed in the Korean Intellectual Property Office on Aug. 30, 2021.

BACKGROUND OF THE INVENTION

Field of Invention

The present disclosure relates to a valve actuator for automatically opening/closing a valve, and more particularly, to a valve actuator having an over-torque interruption function.

Description of Related Art

Refrigerant is essentially used in an air conditioner which is one of the air conditioning devices, and Freon gas used as the refrigerant acts as a factor of global warming.

Therefore, in recent years, refrigerant has been developed, which is not concerned with the global warming, and the newly developed refrigerant does not act as the factor of the global warming, but there is a risk of a fire in the case of refrigerant leakage due to an ignition propensity, and as a result, a valve actuator for automatically actuating a valve for interrupting leakage in the case of the refrigerant leakage has been developed.

As a valve installed between an outdoor unit and an indoor unit of the air conditioner and preventing the refrigerant leakage, a ball valve is primarily used, and as illustrated in FIG. 1, a ball valve 10 includes a ball 11 with a path, a pipe 12 into which the ball 11 is inserted, a stem 13 connected to the pipe 12, a seal member 14 installed in the stem 13, and a stem fixation bolt 15.

A valve actuator for controlling the ball valve having such a configuration generally includes a motor and a gear assembly, and controls the valve by controlling rotation of the motor by using a sensor such as a limit switch, etc., or controlling the rotation of the motor by using a step motor.

As an example, Korean Patent Application No. 10-2007-0141333 (hereinafter, referred to as "prior patent") discloses a valve actuator configured in such a manner that when a projection portion of an output gear connected to the stem of the ball valve among a plurality of gears provided in the gear assembly rotates at 90 degrees or more, an electronic limit switch is pressed to stop the motor.

However, the valve actuator of the prior patent having the electronic limit switch has a problem in that sensors' peculiar instability in a harsh environment.

PRIOR ART DOCUMENT

Korean Patent Application No. 10-2007-0141333

SUMMARY OF THE INVENTION

The present disclosure provides a valve actuator capable of securing durability and driving stability.

The present disclosure also provides a valve actuator removing instability of an electronic sensor.

The present disclosure also provides a valve actuator which need not include a separate PCB for a motor stop signal.

The objects of the present disclosure are not limited to the above-mentioned objects, and other objects and advantages of the present disclosure that are not mentioned can be understood by the following description, and will be more clearly understood by embodiments of the present disclosure.

Further, it will be readily appreciated that the objects and advantages of the present disclosure can be realized by means and combinations shown in the claims.

A valve actuator according to an exemplary embodiment of the present disclosure includes: a motor; a gear assembly including an input gear rotated by driving force of the motor, an output gear receiving rotational force of the input gear, and at least one power transmission gear transmitting the rotational force of the input gear to the output gear; a valve output shaft coupled to the output gear and actuated to close a path of a valve; and a selective power transmitter interrupting rotation of the output gear after the output gear is rotated at a predetermined angle by the rotational force of the input gear, and the selective power transmitter includes a lift member releasing meshing of the first gear and the second gear by moving the first gear to an upper side after the output gear is rotated at the predetermined angle or a friction member provided at the output gear so as to brake the rotation of the first gear by contacting the first gear after the output gear is rotated at the predetermined angle.

The valve actuator further comprises a case in which the gear assembly and the motor are installed.

The motor is installed outside the case and the gear assembly is installed inside the case.

The power transmission gear includes a first gear coupled to the input gear, a second gear coupled to the first gear, and a third gear coupled to each of the second gear and the output gear.

The selective power transmitter includes a lift member releasing meshing of the first gear and the second gear by moving the first gear to an upper side after the output gear is rotated at the predetermined angle.

The lift member includes a body connected to the valve output shaft at the upper side of the output gear and a lever extended from the body and having an end portion positioned at a lower side of the first gear.

A projection is formed on the output gear and a groove portion into which the projection is inserted is formed at the body, and a guide groove guiding vertical movement of the body is formed at the valve output shaft, and a guide portion inserted into the guide groove is formed at the body.

An elastic member pressing the first gear downward is positioned at an upper side of the first gear.

A friction pad providing frictional force to the first gear is formed at the end portion of the lever.

A friction protrusion providing frictional force to the first gear is formed at the end portion of the lever.

The lift member includes a body fixed to a lateral portion of the output gear and a lever extended from the body and having an end portion positioned at a lower side of the first gear.

When the output gear contacts the body, the body is deformed so that the lever contacts the first gear.

The selective power transmitter includes a friction member provided at the output gear so as to brake the rotation of the first gear by contacting the first gear after the output gear is rotated at the predetermined angle.

The output gear is installed at the valve output shaft to be vertically movable.

A projection portion is formed on a lower surface of the output gear, and an inclined surface on which the projection portion is positioned is formed in the case.

Threads engaged with each other are formed at the output gear and the valve output shaft.

According to the present disclosure, driving force of a motor is transmitted to a valve output shaft through a gear assembly and a valve is closed, and then the driving force of the motor is not transmitted to the valve output shaft by the selective power transmitter to prevent damage to the gear assembly and/or the motor due to over-torque and apply a motor of a type in which an RPM control is inaccurate.

In addition, since the electronic sensor is not used, the instability of the electronic sensor can be removed, and a separate PCB for a motor stop signal need not be provided, thereby increasing durability, and improving complexity and material cost.

In addition to the above-described effects, the specific effects of the present disclosure will be described below together while describing the specific matters for the present disclosure.

DETAILED DESCRIPTION OF THE EMBODIMENTS

Figure 1:
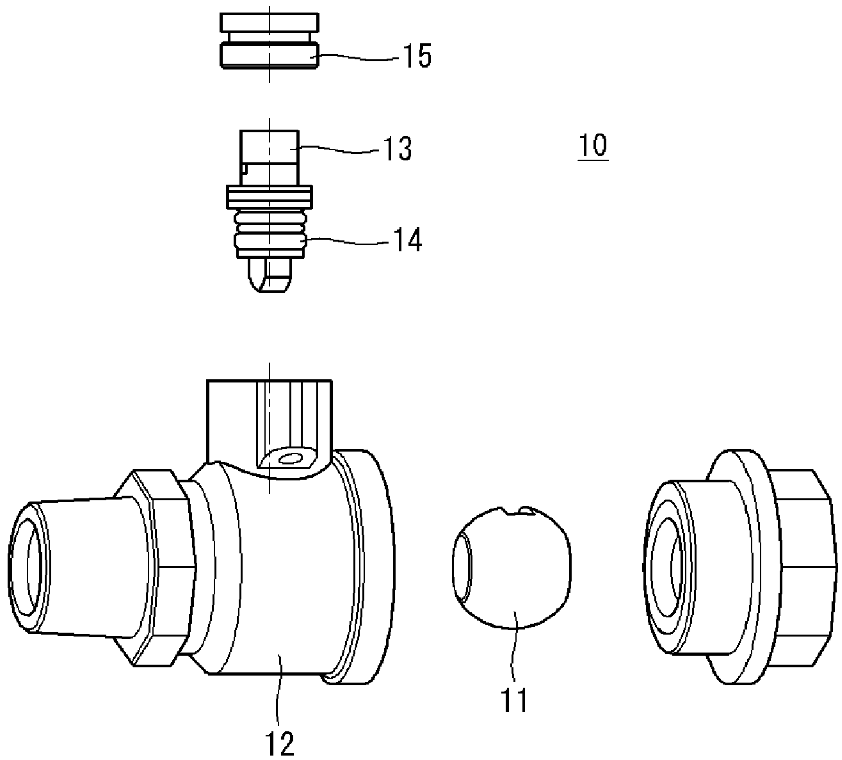
FIG. 1 is an exploded perspective view illustrating a configuration of a general ball valve.

The present disclosure will be described more fully hereinafter with reference to the accompanying drawings, in which exemplary embodiments of the invention are shown. The present disclosure can be realized in various different forms, and is not limited to the exemplary embodiments described herein.

A part irrelevant to the description will be omitted to clearly describe the present disclosure, and the same elements will be designated by the same reference numerals throughout the specification. Further, some exemplary embodiments of the present disclosure will be described in detail with reference to illustrative drawings.

When reference numerals refer to components of each drawing, although the same components are illustrated in different drawings, the same components are denoted by the same reference numerals as possible. Further, in describing the present disclosure, a detailed description of known related configurations and functions may be omitted to avoid unnecessarily obscuring the subject matter of the present disclosure.

In describing the component of the present disclosure, when it is disclosed that any component is “connected”, “coupled”, or “linked” to other components, it should be understood that another component may be “interposed” between respective components or the respective components may be “connected”, “coupled”, or “linked” through another component.

Figure 2:
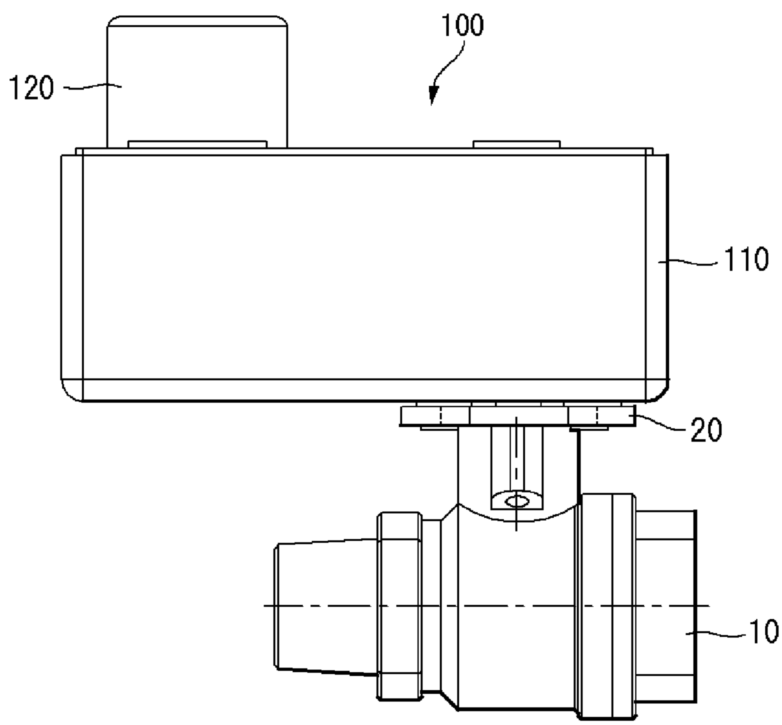
FIG. 2 is a diagram illustrating a coupling state of a valve actuator and a ball valve according to an exemplary embodiment of the present disclosure.
Figure 3:
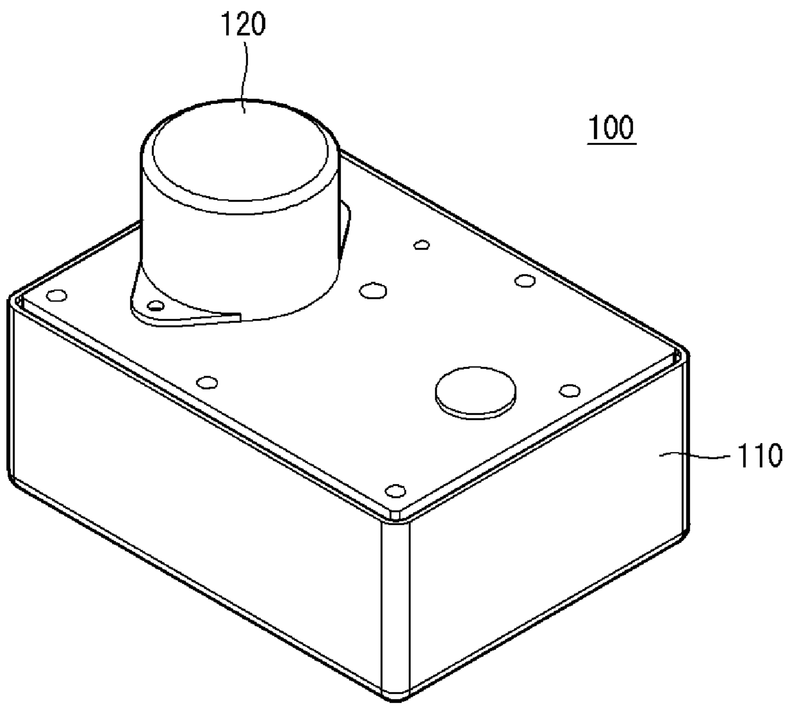
FIG. 3 is an exterior perspective view of the valve actuator illustrated in FIG. 2.

FIG. 2 is a diagram illustrating a coupling state of a valve actuator and a ball valve according to an exemplary embodiment of the present disclosure and FIG. 3 is an exterior perspective view of the valve actuator illustrated in FIG. 2.

As illustrated, in order to install the valve actuator 100 in the ball valve 10, a plate 20 may be installed above the ball valve 10, and the valve actuator 100 may be coupled to the plate 20.

The plate 20 may be fixed to an upper end of the ball valve 10 by a fastening member such as a fastening screw, etc., and the valve actuator 100 may be fixed to the plate 20 by the fastening member such as the fastening screw, etc.

The valve actuator 100 includes a case 110.

The case 110 provides a space in which a motor 120 and a gear assembly provided in the valve actuator 100 are installed, the motor 120 is installed on an upper surface of the case 110 outside the case 110, and the gear assembly is disposed in an internal space of the case 110.

The motor 120 may be a motor of a type in which RPM control is accurate. However, this is not required, and the motor 120 may be a motor of a type in which the RPM control is inaccurate. That is, since the valve actuator according to the exemplary embodiment of the present disclosure may selectively transmit power by a mechanical structure, damage to the gear assembly may be prevented and the ball valve may be accurately controlled while using the motor of the type in which the RPM control is inaccurate.

Figure 4:
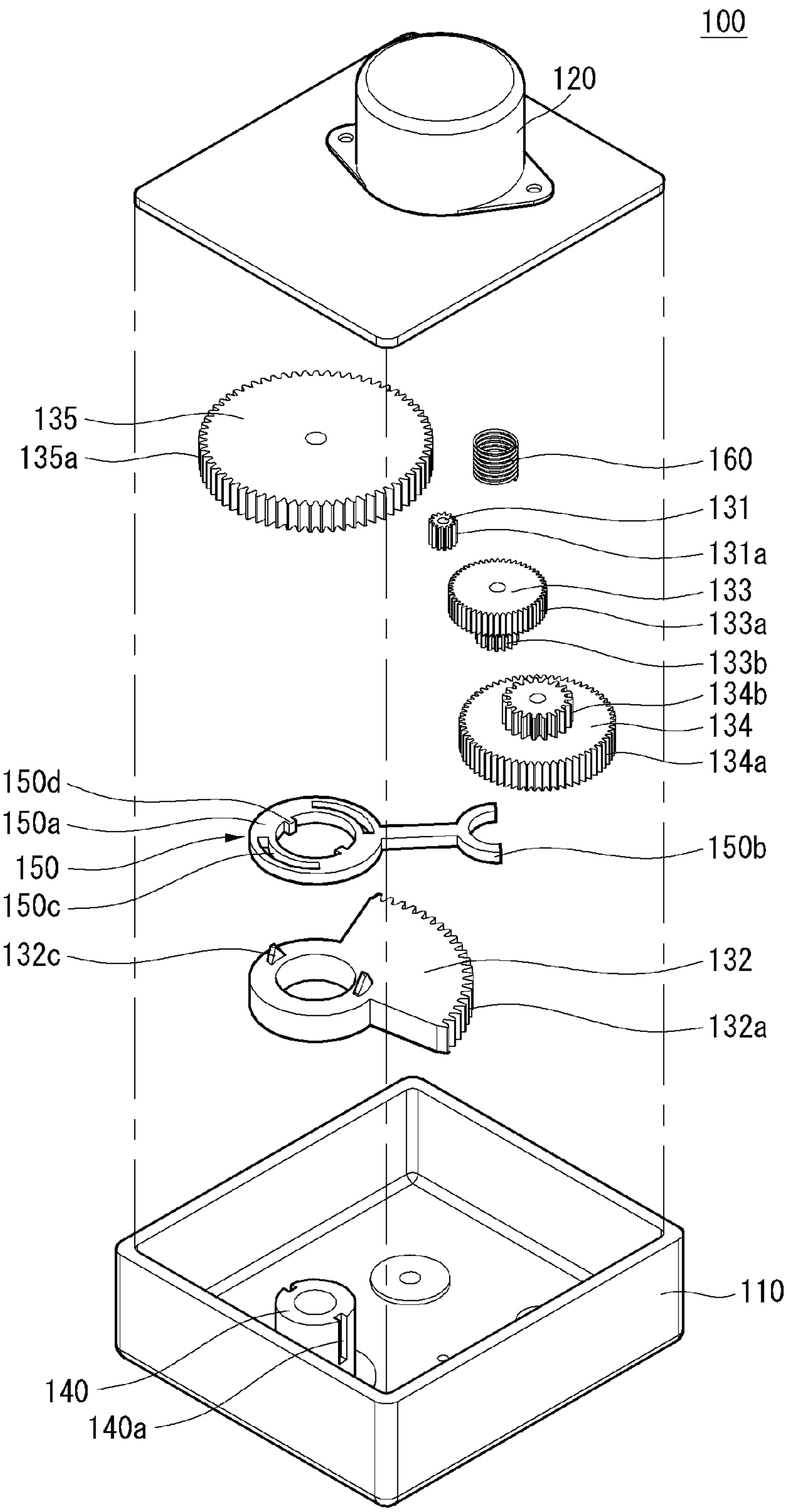
FIG. 4 is an exploded perspective view of a valve actuator according to a first exemplary embodiment of the present disclosure.
Figure 5:
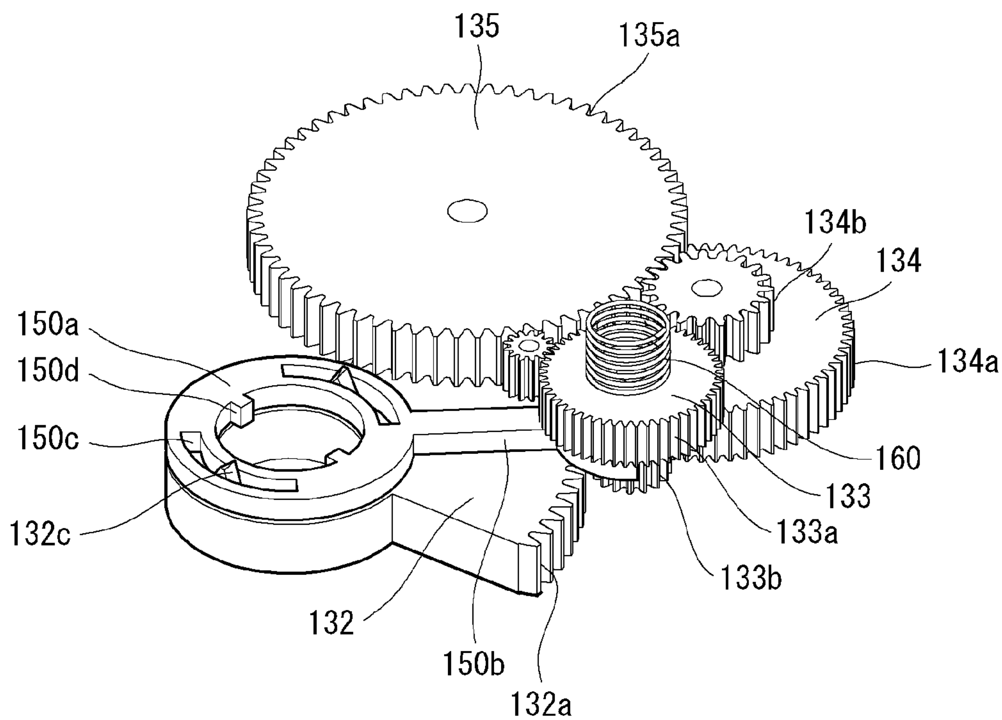
FIG. 5 is a perspective view illustrating a coupling state of a gear assembly and a lift member illustrated in FIG. 4.
Figure 6:
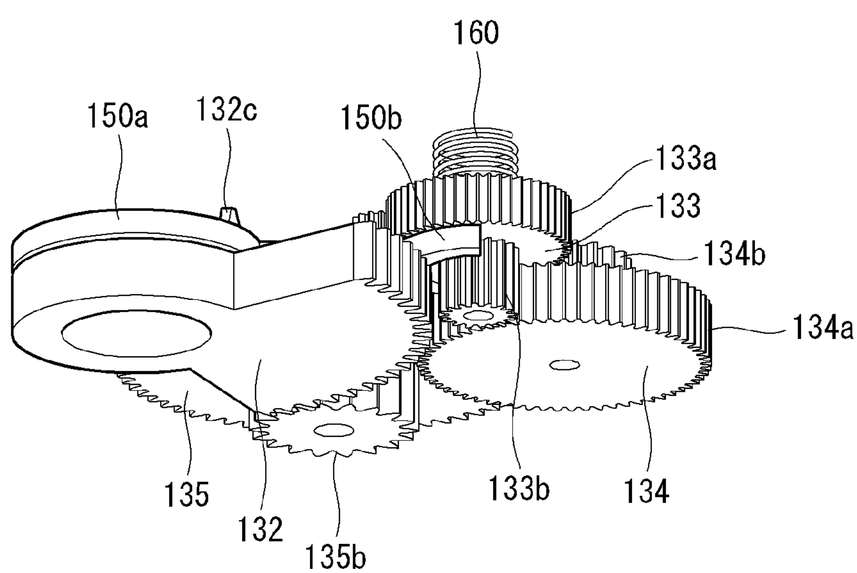
FIG. 6 is a bottom perspective view of the gear assembly and the lift member illustrated in FIG. 5.

FIG. 4 is an exploded perspective view of a valve actuator according to a first exemplary embodiment of the present disclosure, FIG. 5 is a perspective view illustrating a coupling state of a gear assembly and a lift member illustrated in FIG. 4, and FIG. 6 is a bottom perspective view of the gear assembly and the lift member illustrated in FIG. 5.

Figure 7:
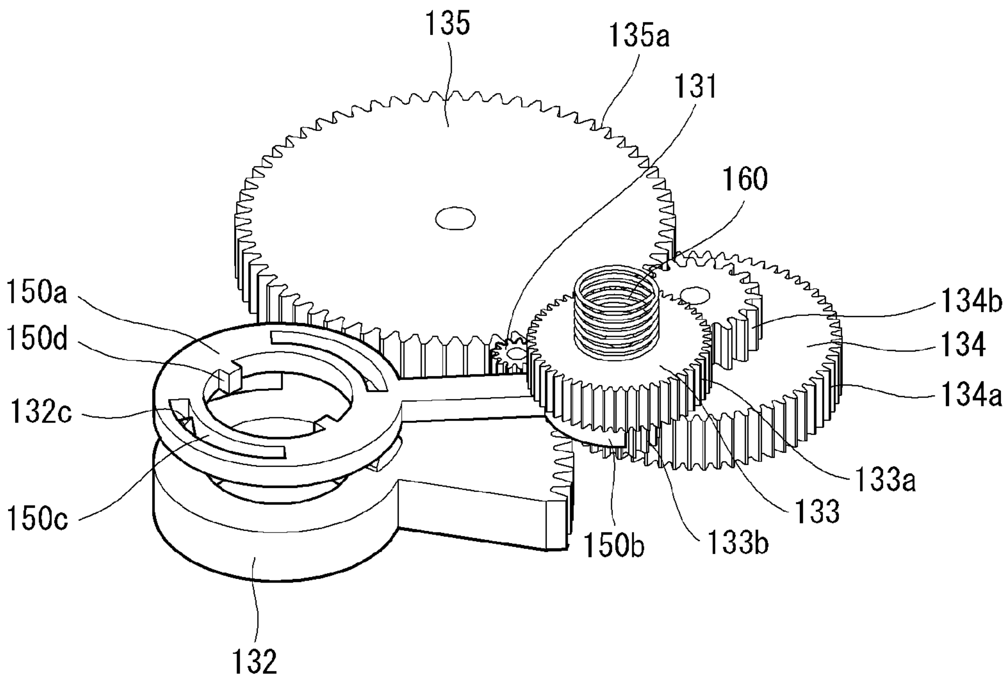
FIGS. 7 and 8 are diagrams illustrating an actuation state of the valve actuator according to the first exemplary embodiment of the present disclosure.
Figure 8:
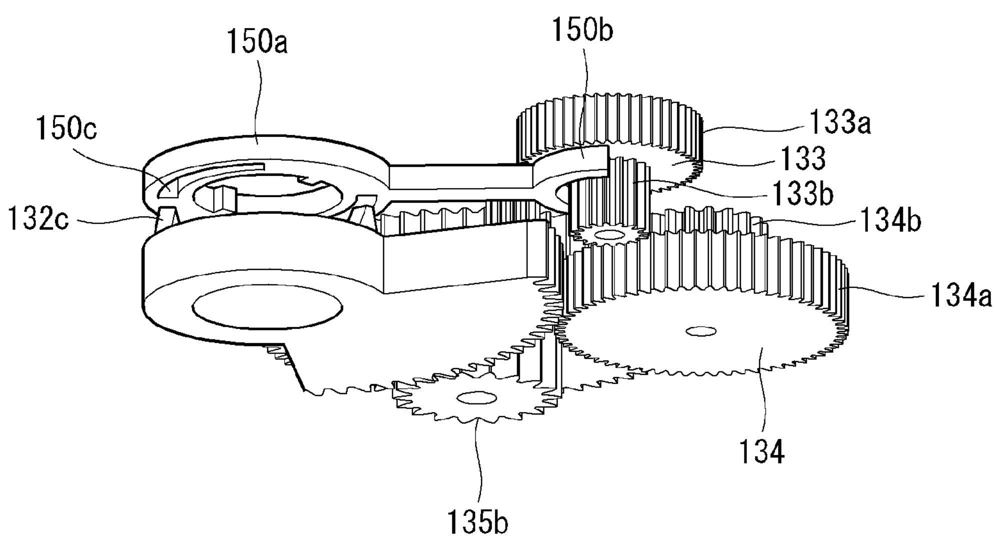
Figure 9:
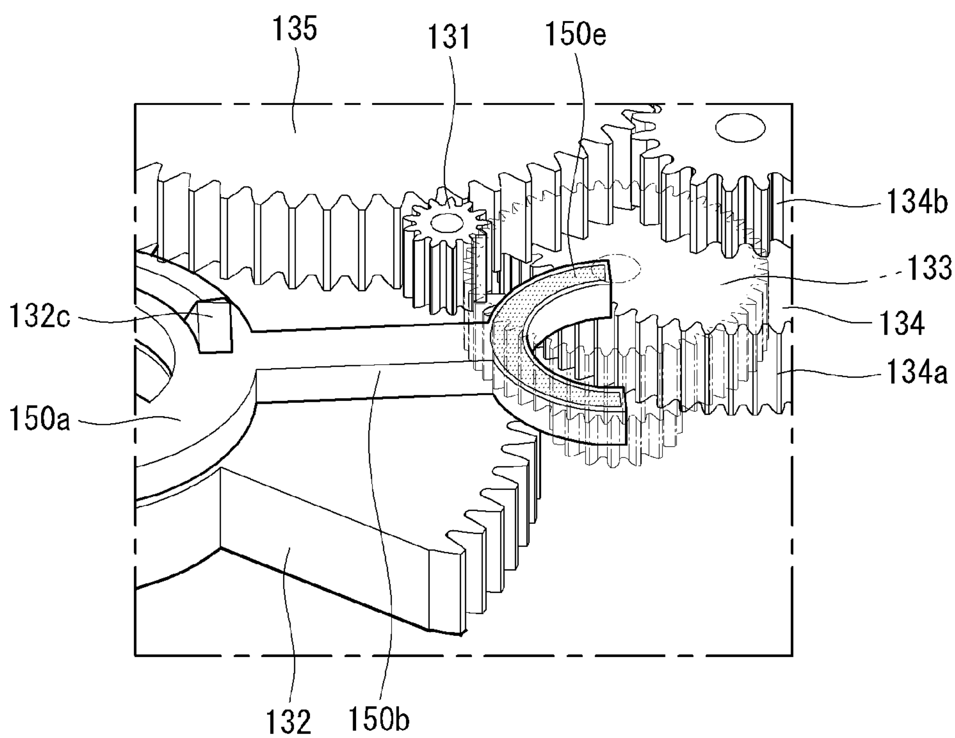
FIGS. 9 and 10 are perspective views of a main part illustrating a modified exemplary embodiment of the lift member provided in the valve actuator according to the first exemplary embodiment of the present disclosure.
Figure 10:
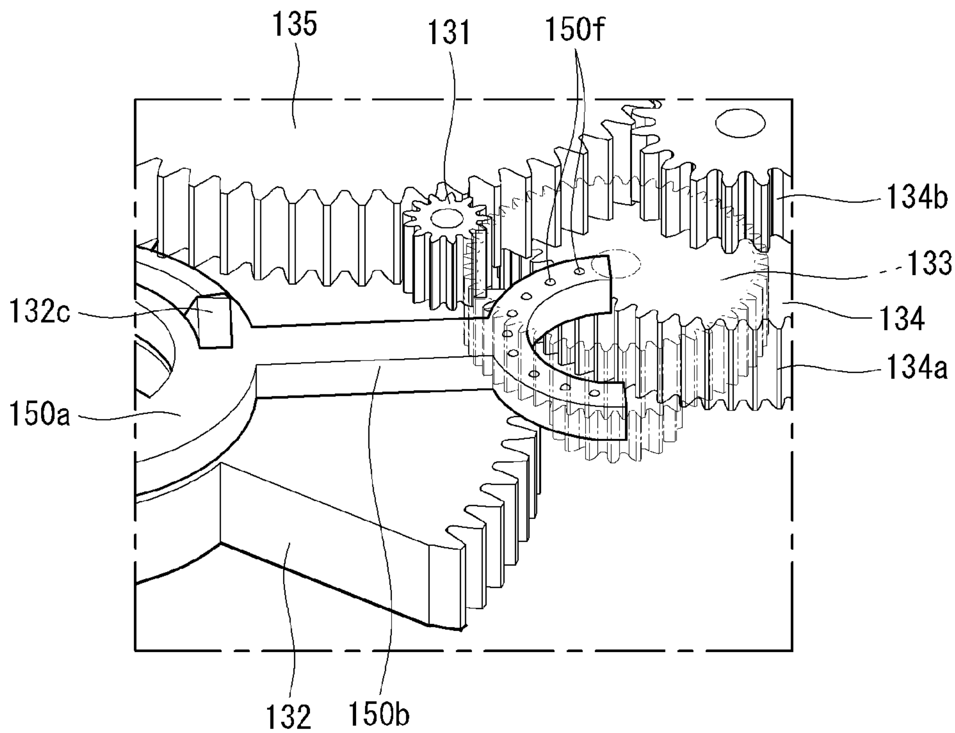

In addition, FIGS. 7 and 8 are diagrams illustrating an actuation state of the valve actuator according to the first exemplary embodiment of the present disclosure.

As illustrated, the gear assembly includes an input gear 131 coupled and/or connected to a rotational shaft of the motor 120 and receiving the driving force of the motor 120, an output gear 132 coupled to a valve output shaft 140 and transmitting rotational force of the input gear 131 to the valve output shaft 140, and at least one power transmission gear transmitting the rotational force of the input gear 131 to the output gear 132.

Hereinafter, it will be described as an example that the power transmission gear is constituted by first to third gears, but the number of power transmission gears may be appropriately changed.

In addition, in the exemplary embodiment, while the rotational force of the input gear is transmitted to the output gear through the power transmission gear, a speed is reduced by the gear assembly or the power transmission gear.

The input gear 131 includes a tooth portion 131*a*.

A first gear 133 coupled to the input gear 131 includes a first tooth portion 133*a* physically directly coupled to the toot portion 131*a* of the input gear 131 and a second tooth portion 133*b* disposed below the first tooth portion 133*a* on an axis of the first gear 133.

A first tooth portion 134*a* of a second gear 134 is physically directly coupled to the second tooth portion 133*b* of the first gear 133, and the second tooth portion 134*b* is positioned above the first tooth portion 134*a* on the axis of the second gear 134.

In addition, a third gear 135 includes a first tooth portion 135*a* physically directly coupled to the second tooth portion 134*b* of the second gear 134, and a second tooth portion 135*b* positioned below the first tooth portion 135*a* on the axis of the third gear 135.

In addition, a tooth portion 132*a* of the output gear 132 is physically directly coupled to the second tooth portion 135*b* of the third gear 135, and the output gear 132 is coupled to the valve output shaft 140.

The tooth portion 132*a* of the output gear 132 may be formed in an arc shape.

In the exemplary embodiment, after the output gear 132 is rotated at a predetermined angle (e.g., 90 degrees) by the rotational force of the input gear 131, a selective power transmitter for interrupting the rotation of the output gear 132 includes a lift member that moves the first gear upward and releasing the engagement of the first gear 133 and the second gear 134.

In the exemplary embodiment, the lift member 150 includes a body 150*a* coupled to the valve output shaft 140 above the output gear 132 and a lever 150*b* extended from the body 150*a* and having an end portion positioned below the first gear 131.

In addition, in order to move the lift member 150 in the vertical direction, a projection portion 132*c* is formed in the output gear 132, and a groove portion 150*c* into which the projection portion 132*c* of the output gear 132 is inserted is formed in the body 150*a* of the lift member 150.

In addition, a guide groove 140*a* for guiding vertical movement of the lift member 150 is formed in the valve output shaft 140, and a guide portion 150*d* inserted into the guide groove 140*a* is formed in the body 150*a* of the lift member 150.

In addition, an elastic member pressing the first gear 133 downward, e.g., a coil spring 160 is positioned above the first gear 133.

Accordingly, in a state in which the gear assembly 130 and the lift member 150 are coupled as illustrated in FIGS. 5 and 6, the projection portion 132*c* of the output gear 132 is positioned within the groove portion 150*c* provided in the body 150*a* of the lift member 150 within a normal actuation range of the valve actuator.

In addition, in this state, the body 150*c* of the lift member 150 is seated on the output gear 132.

Here, the "normal actuation range of the valve actuator" means a state in which driving of the motor 120 is stopped and an initial state in which the motor 120 is driven in order to close the path by controlling the ball valve 10.

However, when the motor 120 is driven in order to close a path by controlling the ball valve 10, the output gear 132 is rotated.

In this case, since the projection portion 132*c* of the output gear 132 is positioned within the groove 150*c* provided in the body 150*a* of the lift member 150, only the output gear 132 is rotated in a state in which the lift member 150 is stopped.

However, after the output gear 132 is rotated at a predetermined angle, e.g., 90 degrees and the path of the ball valve is thus closed, the projection portion 132*c* of the output gear 132 deviates from the groove portion 150*c* provided in the body 150*a* of the lift member 150 and the lift member 150 moves upward while the projection portion 132*c* starts to deviate from the groove portion 150*c* provided in the body 150*a* of the lift member 150, as illustrated in FIGS. 7 and 8.

In this case, the lift member 150 moves by a mutual actuation of the guide groove 140*a* provided in the valve output shaft 140 and a guide portion 150*d* provided in the body 150*a* of the lift member 150.

Accordingly, since the lever 150*b* provided in the lift member 150 moves the first gear 133 upward, the engagement of the second tooth portion 133*b* of the first gear 133*a* and the first tooth portion 134*a* of the second gear 134 is released, and as a result, the rotational force of the input gear 131 is not transmitted to the output gear 132.

Meanwhile, in order to more effectively achieve upward movement of the first gear 133, at least one of a friction pad 150*e* or a friction protrusion 150*f* may be provided at an end portion of the lever 150*b*, and at least one of the friction pad or the friction protrusion may be provided even on a lower surface of the first gear 133.

Hereinafter, other exemplary embodiments will be described.

Figure 11:
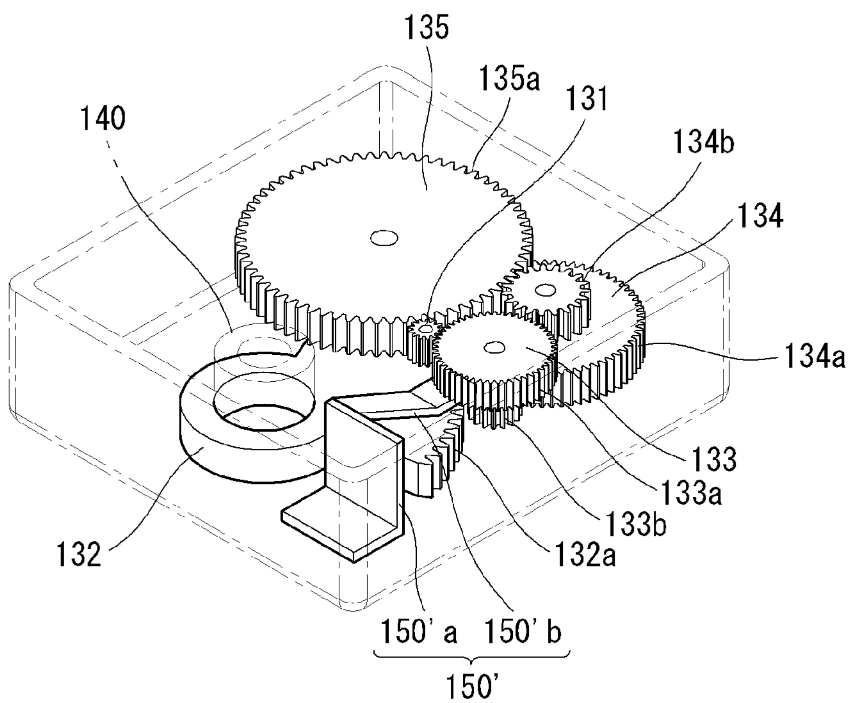
FIG. 11 is a perspective view of a valve actuator according to a second exemplary embodiment of the present disclosure.
Figure 12:
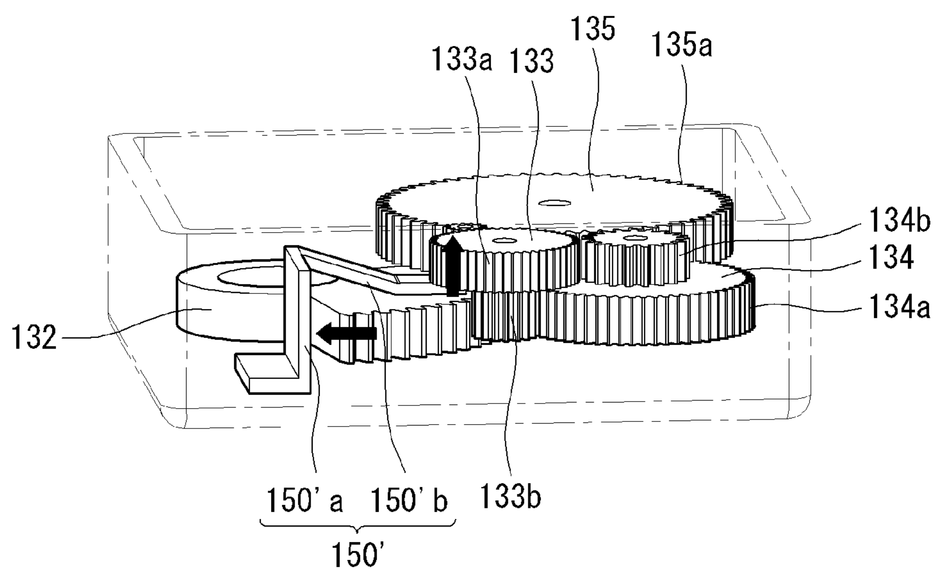
FIG. 12 is a diagram illustrating an actuation state of the valve actuator according to the second exemplary embodiment of the present disclosure.

FIG. 11 is a perspective view of a valve actuator according to a second exemplary embodiment of the present disclosure and FIG. 12 is a diagram illustrating an actuation state of the valve actuator according to the second exemplary embodiment of the present disclosure.

In the valve actuator according to the exemplary embodiment, since the remaining configurations except for the lift member are configured in the same or similar manner as the first exemplary embodiment, a detailed description thereof will be omitted.

In the exemplary embodiment, a lift member 150' includes a body 150'*a* coupled to a lateral portion of the output gear 132 and a lever 150'*b* extended from the body 150'*a* and having an end portion positioned below the first gear 133.

Accordingly, in a state in which the gear assembly 130 and the lift member 150' are coupled, the tooth portion 132*a* of the output gear 132 is spaced apart from the body 150'*a* of the lift member 150' within the normal actuation range of the valve actuator.

However, when the motor 120 is driven in order to close a path by controlling the ball valve 10, the output gear 132 is rotated.

In addition, after the output gear 132 is rotated at a predetermined angle, i.e., 90 degrees and the path of the ball valve is thus closed, the tooth portion 132*a* of the output gear 132 contacts the body 150'*a* of the lift member 150', and when the output gear 132 is continuously rotated, the lever 150'*b* is lifted upward while the body 150'*a* of the lift member 150' is transformed in an arrow direction.

Accordingly, since the first gear 133 moved upward by the lever 150'*b* provided in the lift member 150', the engagement of the second tooth portion 133*b* of the first gear 133*a* and the first tooth portion 134*a* of the second gear 134 is released, and as a result, the rotational force of the input gear 131 is not transmitted to the output gear 132.

Meanwhile, in order to more effectively achieve upward movement of the first gear 133, at least one of the friction pad or the friction protrusion may be provided at an end portion of the lever 150'*b*, and at least one of the friction pad or the friction protrusion may be provided even on the lower surface of the first gear 133, as described in the exemplary embodiment described above.

It is described as an example that the selective power transmitter of the valve actuator includes the lift member and the engagement of the first gear and the second gear is thus released in the above exemplary embodiments, but it is also possible to brake the first gear not to be rotated instead of releasing the engagement of the first gear and the second gear.

Figure 13:
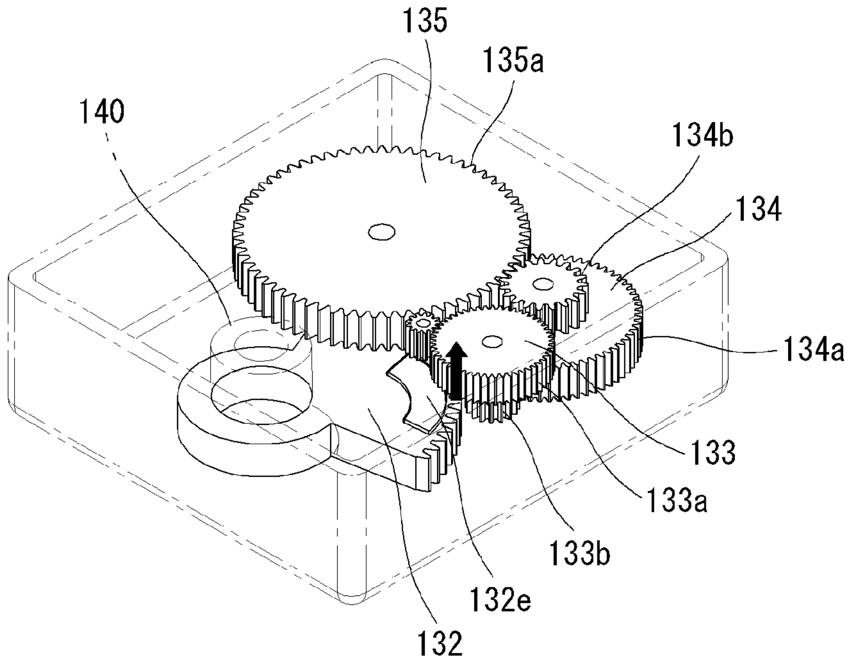
FIG. 13 is a perspective view of a valve actuator according to a third exemplary embodiment of the present disclosure.
Figure 14:
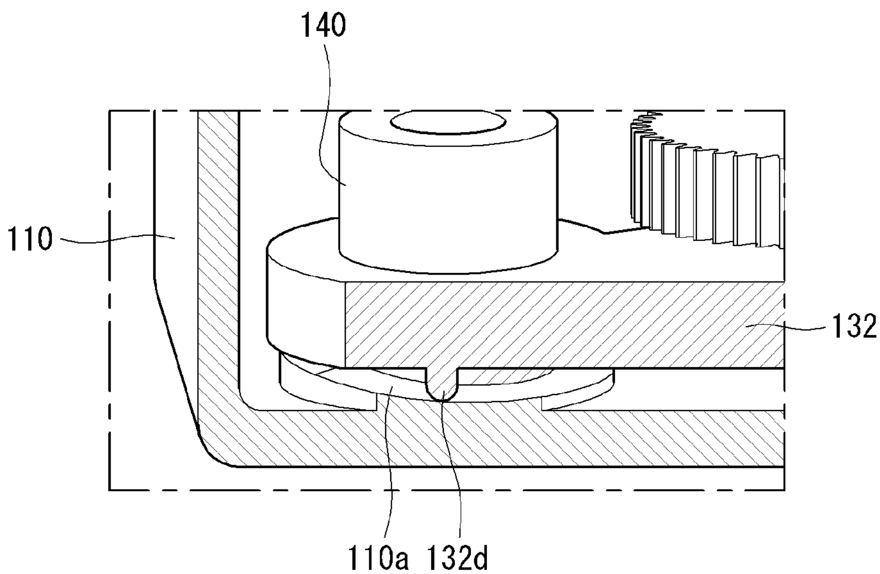
FIGS. 14 and 15 are diagrams illustrating a configuration of a main part for moving an output gear in a vertical direction in the valve actuator according to the third exemplary embodiment of the present disclosure.

Hereinafter, a valve actuator according to a third exemplary embodiment of the present disclosure will be described with reference to FIGS. 13 to 15.

The valve actuator according to the third exemplary embodiment does not include the lift member according to the first and second exemplary embodiments described above, but includes the friction member provided in the output gear in order to brake the first gear by using the rotation of the output gear.

In the exemplary embodiment, the output gear 132 is coupled to the valve output shaft 140 to be vertically movable.

To this end, the projection portion 132*d* may be formed on the lower surface of the output gear 132 and an inclination surface 110*a* at which the projection portion 132*d* is positioned may be formed in the case 110.

In addition, the friction member such as a friction pad 132*e*, etc., may be provided in the output gear 132, and the fiction pad such as a friction pad, etc., may be provided even in the first gear 133 at a location facing the friction pad 132*d* of the output gear 132.

In the exemplary embodiment, since a safety rte of the first gear among the first to third gears is the highest, the first gear 133 is braked by using the friction pad 132*e* of the output gear 132.

For example, the input gear 131 may have a safety rte of 3.0, the first gear may have a safety rate of 1.8, the second gear may have a safety rate of 1.6, and the third gear may have a safety rate of 1.1.

According to such a configuration, the projection portion 132*d* of the output gear 132 is positioned on the inclination surface 110*a* of the case 110 within the normal actuation range of the valve actuator.

However, when the motor 120 is driven and the output gear 132 is thus rotated, the path of the valve is closed, and even then, when the motor 120 is continuously driven, the protrusion 132*c* of the output gear 132 moves along the inclination surface 110*a*, and then deviates from the inclination surface 110*a*.

Accordingly, the output gear 132 moves upward while the protrusion 132*c* moves along the inclination surface 110*a*, and as a result, the friction pad 132*e* of the output gear 132 is in close contact with the lower surface of the first gear 133 and the first gear 133 is thus braked.

Figure 15:
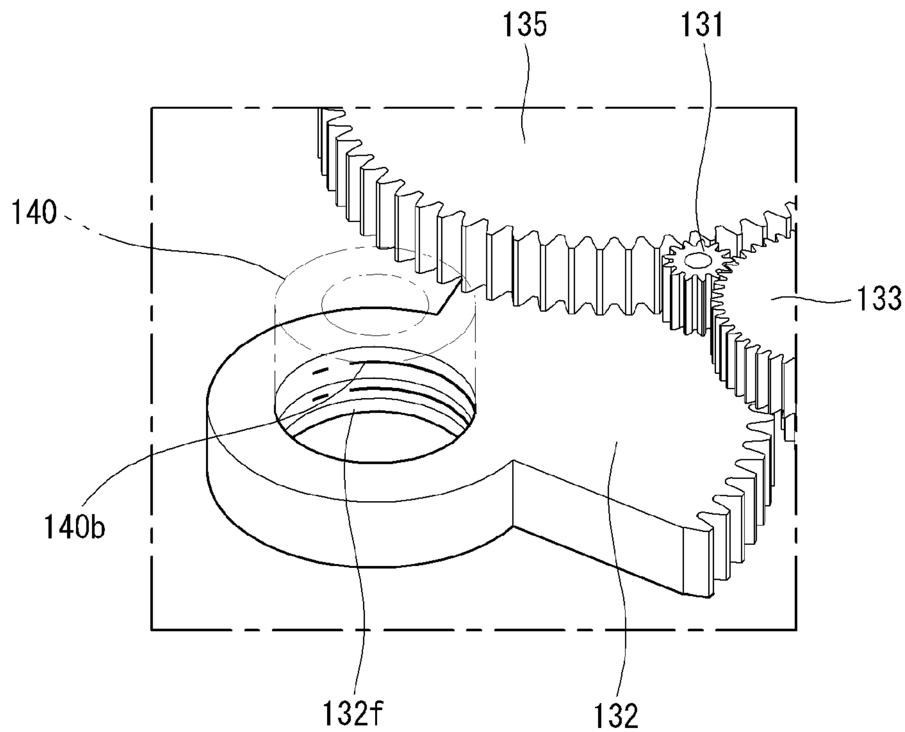

Unlike this, as illustrated in FIG. 15, threads 140*b* which are engaged with each other may be formed in the output gear 132 and the valve output shaft 140.

In this case, a thread 132*f* of the output gear 132 and a thread 140*b* of the valve output shaft 140 may not be engaged with each other within the normal actuation range of the valve actuator, and the output gear 132 may rotate together with the valve output shaft 140.

Accordingly, the thread 132*f* of the output gear 132 and the thread 140*b* of the valve output shaft 140 may be formed with a predetermined height difference within the normal actuation range of the valve actuator.

However, when the motor 120 is driven and the output gear 132 is thus rotated, the path of the ball valve is closed, and even then, when the motor 120 is continuously driven, the thread 132*f* of the output gear 132 and the thread 140*b* of the valve output shaft are engaged with each other, and as a result, the friction pad 132*e* of the output gear 132 is in close contact with the lower surface of the first gear 133 while the output gear 132 moves upward, and the first gear 133 is thus braked.

Accordingly, the valve output shaft 140 is rotated and the path of the ball valve is thus closed, and then the driving force of the motor 120 is not transmitted to the valve output shaft 140 even though the driving of the motor 120 is not stopped, but the motor 120 is continuously driven.

Accordingly, the motor and/or the gear assembly are/is prevented from being damaged due to the over-torque.

In addition, since the valve actuator of the present disclosure uses the lift member or the friction member having a simple structure, the durability and the driving stability of the valve actuator are secured.

In addition, since the valve actuator of the present disclosure need not include a separate electronic switch and a separate PCB for the motor stop signal, the instability of the electronic switch or the electronic sensor is removed, and the complexity and the material cost of the device are improved.

Hereinabove, the valve actuator for controlling the ball valve provided in the air conditioner has been described, but the valve actuator according to the present disclosure may be used in a valve for controlling a path of gas or a fluid.

What is claimed is:

1. A valve actuator comprising:

a motor;

a gear assembly comprising:

an input gear configured to be rotated by driving force of the motor, an output gear configured to receive rotational force from the input gear, and at least one power transmission gear configured to transmit the rotational force from the input gear to the output gear;

a valve output shaft coupled to the output gear and configured to be rotated by the output gear to thereby open and close a valve;

a selective power transmitter that is configured to limit rotation of the output gear based on the output gear being rotated by a predetermined angle about an axis; and a case that supports the gear assembly and the motor, wherein the motor is disposed outside the case, and the gear assembly is disposed inside the case, wherein the at least one power transmission gear comprises a plurality of gears comprising:

a first gear coupled to the input gear, a second gear configured to couple to the first gear, and a third gear coupled to each of the second gear and the output gear, and wherein the selective power transmitter comprises a lift that is configured to, based on the output gear being rotated by the predetermined angle about the axis, move the first gear to an upper side of the second gear to thereby release coupling of the first gear and the second gear.

2. The valve actuator of claim 1, wherein the lift comprises:

a body disposed above the output gear and connected to the valve output shaft; and a lever that extends from the body and has an end portion disposed at a lower side of the first gear.

3. The valve actuator of claim 2, wherein the output gear comprises a projection, wherein the body defines a groove configured to receive the projection of the output gear, the body comprising a guide that is configured to be inserted to the valve output shaft, and wherein the valve output shaft defines a guide groove that is configured to receive the guide of the body and to guide a vertical movement of the body along the valve output shaft.

4. The valve actuator of claim 2, wherein the first gear comprises:

a first tooth portion coupled to the input gear; and a second tooth portion spaced apart from the first tooth portion of the first gear in a first direction and coupled to the second gear, and wherein the end portion of the lever comprises a fork that surrounds a portion of the second tooth portion of the first gear and is configured to contact the lower side of the first gear.

5. The valve actuator of claim 3, further comprising:

an elastic member disposed at an upper side of the first gear and configured to press the first gear toward the second gear.

6. The valve actuator of claim 3, further comprising:

a friction pad disposed at the end portion of the lever and configured to apply frictional force to the first gear.

7. The valve actuator of claim 3, further comprising:

a friction protrusion disposed at the end portion of the lever and configured to apply frictional force to the first gear.

* * * * *